UNITED STATES PATENT OFFICE.

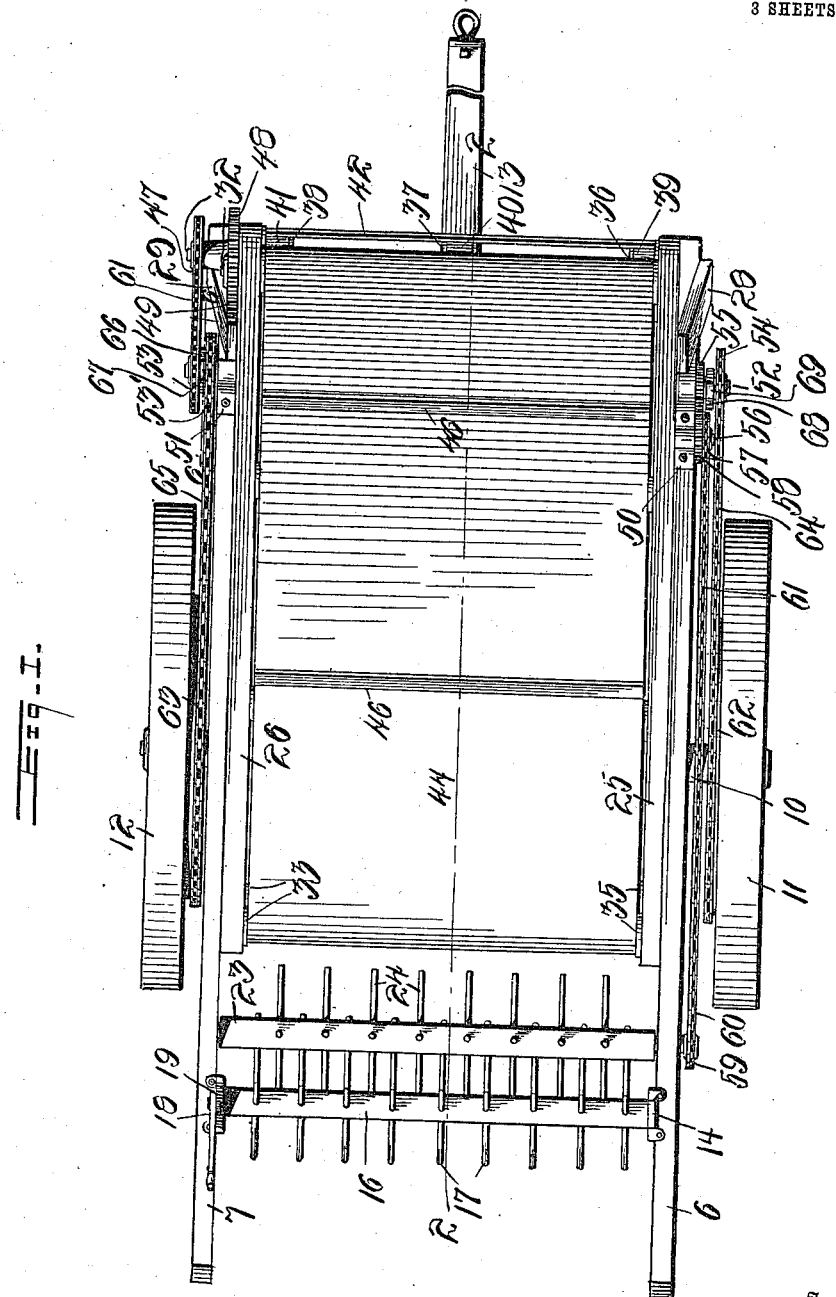

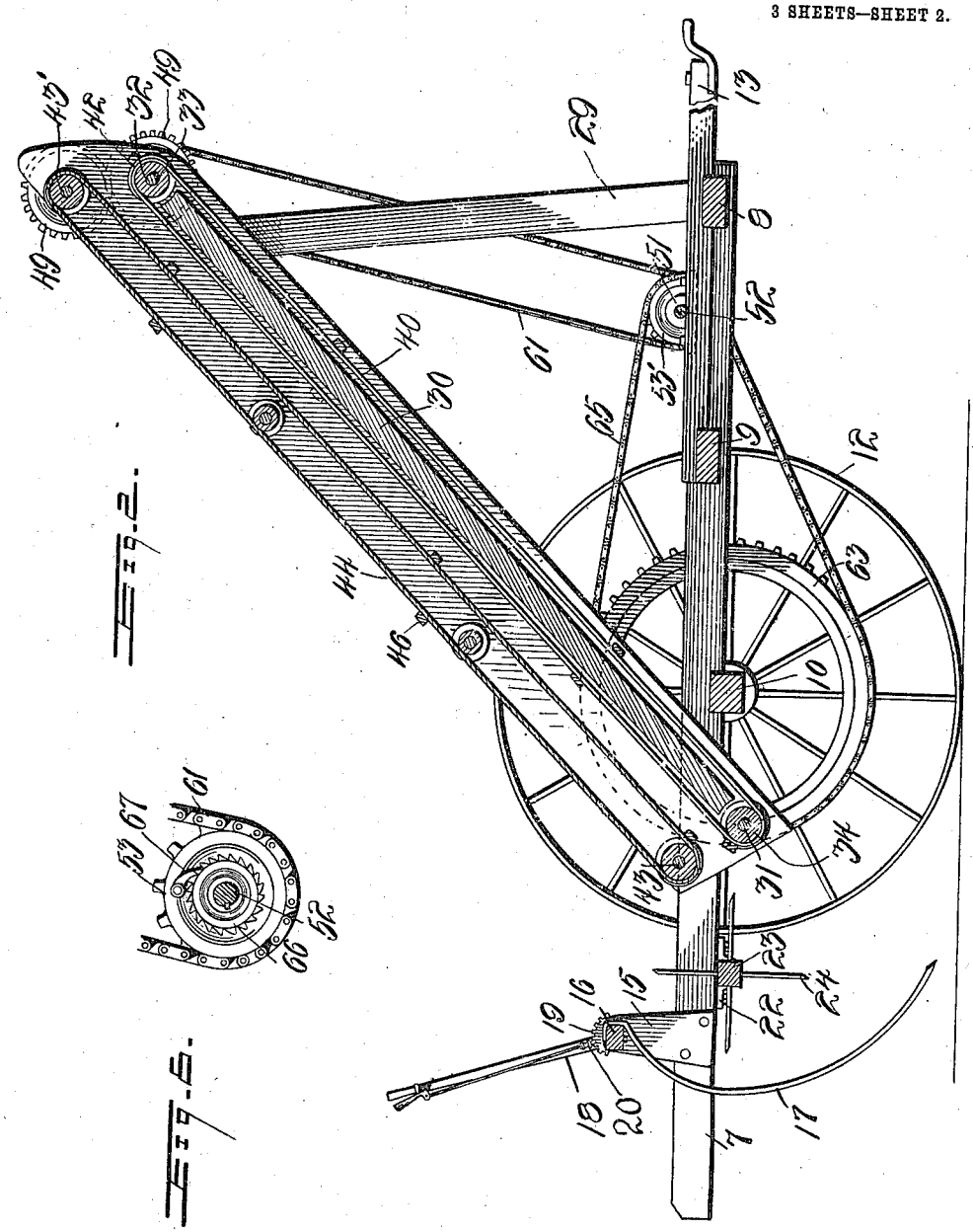

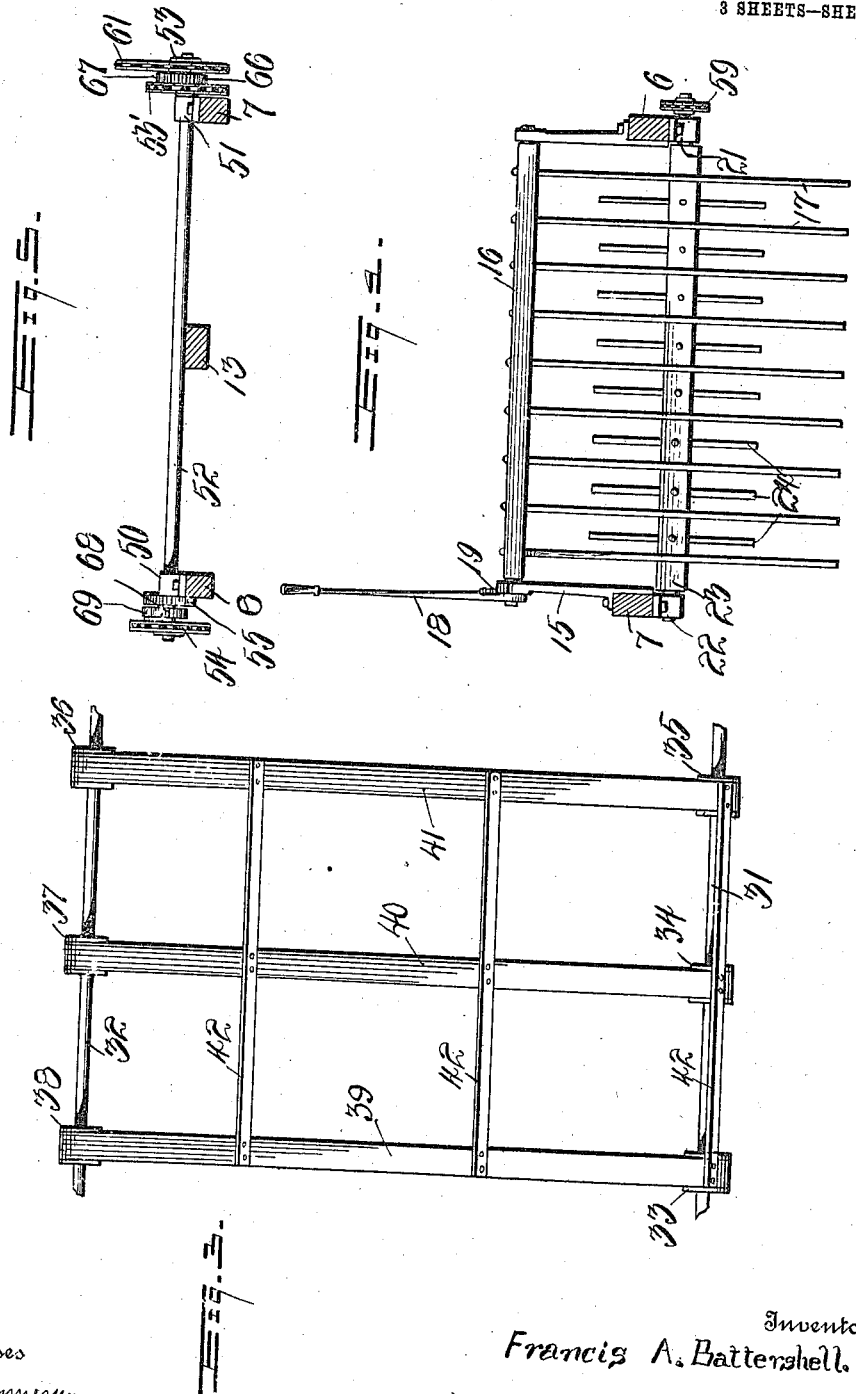

FRANCIS A. BATTERSHELL, OF BOULDER, MONTANA, ASSIGNOR OF ONE-HALF TO LEES TAYLOR, OF BOULDER, MONTANA.

HAY-LOADER.

963,113. Specification of Letters Patent. Patented July 5, 1910.

Application filed October 25, 1909. Serial No. 524,522.

*To all whom it may concern:*

Be it known that I, FRANCIS A. BATTERSHELL, a citizen of the United States, residing at Boulder, in the county of Jefferson, State of Montana, have invented certain new and useful Improvements in Hay-Loaders; and I do hereby declare the following to be a full, clear, and exact description of the invention, such as will enable others skilled in the art to which it appertains to make and use the same.

This invention relates to hay loading machines.

The object of the invention is to provide a hay loading machine which is thoroughly effective and reliable in operation and which comprises but few parts not easily broken and not liable to get out of order.

A further object is to provide a machine of this character which is simple in construction and organization and which is comparatively inexpensive to manufacture besides being easily controlled in the field, and possesses the capacity for long and repeated service.

The above and other objects are attained by means of the construction illustrated in the accompanying drawings, forming a part of this specification, in which similar characters of reference indicate corresponding parts in the several views, and in which, Figure 1 is a top plan view of a hay loading machine constructed in accordance with the invention; Fig. 2, a section on the line 2—2 of Fig. 1; Fig. 3, a top plan view of the elevating mechanism of the machine with the upper carrier removed; Fig. 4, a partial front elevation showing the manner of mounting the rake and the feeding mechanism; Fig. 5, a detail view of the motor driven shaft and the parts carried thereby; and, Fig. 6, a section on the line 6—6 of Fig. 1.

Referring to the drawings, the machine is shown as comprising a supporting frame formed of the side bars 6 and 7 which are secured together through the medium of the cross braces 8 and 9 and the non-rotatable axle 10, said axle having its terminals provided with suitable journal bearings upon which the traction wheels 11 and 12 are mounted for rotation, said wheels serving to support the machine during its travel and constitute the source of power for operating same. In the attachment of the machine to a wagon which it is desired to load the rearwardly projecting end 13 of the tongue of said wagon is secured to the cross braces 8 and 9 in any suitable manner. Secured to the side bars 6 and 7 of the frame near the rear ends thereof are the upwardly extending arms 14 and 15 respectively which constitute journals for the rake head 16 which carries the rake teeth 17. The rotation of said rake head for an adjustment of the rake teeth carried thereby is had through the medium of a lever 18 which is secured to said head in a fixed manner. A toothed segment 19 is likewise secured adjacent said lever independently of the rake head and a pawl 20 mounted on the lever is adapted for engagement with the teeth of the segment 19 whereby said rake head and the teeth carried thereby may be maintained in any desired adjusted position. Depending from the side bars 6 and 7, near their rear ends are the journal brackets 21 and 22 respectively in which is mounted for rotation a shaft 23 which carries the radially disposed teeth 24. The shaft 23 and the teeth 24 are as will be understood adapted for simultaneous rotation the operation of which will be presently described.

The carrier mechanism of the loader is formed of two parallel spaced side members 25 and 26 disposed at an incline and having their lower ends secured to the side bars 6 and 7 respectively of the supporting frame. The upper ends of the side members of the carrier are likewise supported by the side bars 6 and 7 through the medium of the braces 28 and 29. Disposed between the side bars 25 and 26 is a bottom member 30. A shaft 31 is journaled between the side members 25 and 26 slightly beyond the lower end of the bottom member 30, while a shaft 32 is similarly journaled slightly beyond the upper end of said bottom member. Each of the shafts 31 and 32 have fixed thereto three correspondingly located pulleys 33, 34, 35, and 36, 37, 38, respectively. Traveling on the pulleys 35 and 36 and passing around the bottom member 30 is an endless belt 39 while similar belts 40 and 41 extend around said bottom member and travel on the pulleys 34, 37, and 33, 38 respectively. The belts 39, 40 and 41 are connected together at suitable intervals by the transverse bars 42. Journaled between the lower end of the side bars 25 and 26 and disposed above the shaft 31 is another shaft 43, while a corresponding shaft 43' is journaled between the said side members at their upper end and disposed above the shaft 32. The shafts 43 and 43' are of sufficient diameter to form a suitable bearing for the endless conveyer 44 which is mounted for travel thereon. Disposed transversely of the endless conveyer 44 are the bars 46 of similar construction to the bars 42 which are carried by the belts 39, 40 and 41.

The shaft 32 has mounted on one end thereof a sprocket wheel 47 and a gear 48 while the shaft 43' carries a gear 49 which meshes with the gear 48 of the shaft 32 whereby a rotation of the shaft 32 will produce a rotation of the shaft 43'. Mounted on the side bars 6 and 7 of the supporting frame of the machine are the trunnions 50 and 51 respectively, which constitute bearings for a shaft 52. On one end of the shaft 52 is mounted a sprocket wheel 53 and on the other end a sprocket wheel 54 and a gear 55. Slightly to the rear of the shaft 52 and journaled on the side bar 6 is another shaft 56 which carries thereon a sprocket wheel 57 and a gear 58 which meshes with a gear 55 of the shaft 52 so that a rotation of the shaft 52 will produce a corresponding rotation of the shaft 56. Mounted on the projecting end of the shaft 23 is a sprocket wheel 59 which carries in conjunction with the sprocket wheel 57 a sprocket chain 60 while another sprocket chain 61 is mounted for travel on the wheel 47 and 53 carried by the shafts 32 and 52 respectively. Mounted on the axle 10 for simultaneous rotation with the traction wheels 11 and 12 respectively are the sprocket wheels 62 and 63. Mounted for travel on the sprocket wheels 62 and 54 is a sprocket chain 64, while a similar chain 65 is mounted for travel on the sprocket wheels 63 and 53'. The said sprocket wheel 53' being mounted on the shaft 52 adjacent the sprocket wheel 53.

In use it will be obvious that when the machine is attached to a wagon and propelled over the field the traction wheels 11 and 12 will be rotated and as the sprocket wheels 62 and 63 are fixed to said wheels respectively a corresponding rotation thereof will also take place. This rotation of the sprocket wheels 62 and 63 will through the instrumentality of the sprocket chains 64 and 65 rotate the shaft 52 because of the operative connection of said chain with the sprocket wheels 54 and 53' respectively. The rotation of the shaft 52 will likewise cause a rotation of the shaft 32 by reason of the sprocket chain connection 61 between the sprocket wheels 53 and 47 and the rotation of the shaft 32 will be in turn imparted to the shaft 43' by the gears 48 and 49. The rotation of the shafts 32 and 43' will produce a simultaneous travel of the endless conveyer 44 and the belts 39, 40 and 41, and any product that is fed between said endless conveyer and belts at their lower ends will be engaged, carried upwardly and disengaged therefrom at their upper ends into the wagon being loaded.

It will be apparent that by reason of the meshing gears 55 and 58 the shaft 56 and the sprocket wheel 57 will also be rotated when the shaft 52 is rotated and as the sprocket wheel 57 is operatively connected with the sprocket wheel 59 of the shaft 23 by the sprocket chain 60 said shaft 23 will also be rotated in the direction of the arrow shown in Fig. 2. This rotation of the shaft 23 will of course effect a rotation of the radial teeth 24 carried thereby and will feed the product gathered by the rake teeth 17 between the conveyer 44 and the belts 39, 40 and 41; the cross bars 42 and 46 serving to engage the product and effect a positive travel thereof upwardly between said conveyer and said belts.

As the machine can be operated either by a rotation of the traction wheel 11 or the traction wheel 12 it will be understood that unless both of said wheels are traveling at the same rate some provision will have to be made to permit the mechanism to receive its motion from the traction wheel which is traveling at a greater speed without interference from the traction wheel than is traveling at a less speed, such condition commonly arising when the loader is making a turn. To prevent any interference with the operation of the mechanism when the traction wheels are traveling at different rates of speed the sprocket wheels 53 and 54 are loosely mounted on the shaft 52 and adjacent the inner face of the sprocket wheel 53 a ratchet wheel 66 is fixed to the shaft 52 and a pawl 67 pivoted to the inner face of the sprocket wheel 53 is adapted to engage the teeth of the ratchet wheel 66 when said sprocket wheel is rotated by a forward movement of the traction wheel 12; likewise another ratchet wheel 68 is fixed to the shaft 52 adjacent the inner face of the sprocket wheel 54 and a pawl 69 is pivoted to said sprocket wheel and adapted to engage the teeth of the ratchet wheel 68 when the sprocket wheel 54 is rotated under the influence of a forward movement of the traction wheel 11.

From the construction just described it will be apparent that should the traction wheel 11 be rotated more rapidly than the traction wheel 12 the shaft 52 will in turn be rotated at a greater rate of speed than would be imparted to it by a rotation of the sprocket wheel 53 under the influence of the movement of the traction wheel 12, and under ordinary conditions this would produce a binding of the mechanisms.

However, as the sprocket wheel 53 is loosely mounted the increased speed of rotation of the shaft 52 will be without hindrance as the pawl 67 will simply ride freely over the teeth of the ratchet wheel 66. Should the speed of rotation of the traction wheel 12 be greater than the rotation of the traction wheel 11 these conditions will be reversed through the instrumentality of the sprocket wheel 54, ratchet wheel 68 and pawl 69 and the natural hindrance to the operation of the mechanism under the last named conditions obviated.

What is claimed is:—

A hay loading machine comprising a frame, a pair of traction wheels supporting said frame, an elevator, a rake, a rotatable beater journaled in said frame between the rake and elevator, a sprocket wheel rotatable with each of said traction wheels, a sprocket wheel fixed on the shaft of the rotatable beater, a counter-shaft journaled in said frame forward of the traction wheels, a sprocket wheel loosely mounted on each end of said counter-shaft, sprocket chains operatively connecting said sprocket wheels respectively with the sprocket wheel rotatable with the traction wheels, a ratchet wheel fixed on each end of said shaft, a pawl carried by each of the sprocket wheels on the counter-shaft operatively engaging an adjacent ratchet wheel for imparting the rotation of said sprocket wheels in one direction to said counter-shaft, a gear wheel fixed on said counter-shaft, a second shaft journaled in said frame having a gear fixed thereon in mesh with the gear on the counter-shaft, a sprocket wheel fixed to said second named shaft, a sprocket chain traveling on the sprocket wheel of the second named shaft, and the sprocket wheel carried by the shaft of the rotatable beater and connections between the counter-shaft and the elevator for operating the latter.

In testimony whereof, I affix my signature, in presence of two witnesses.

FRANCIS A. BATTERSHELL.

Witnesses:
J. H. BRIDGES,
WM. HUNT.